(No Model.)
F. MAROHN.
PROCESS OF PRODUCING OINTMENT BASES FROM RAW WOOL FAT.
No. 556,014. Patented Mar. 10, 1896.
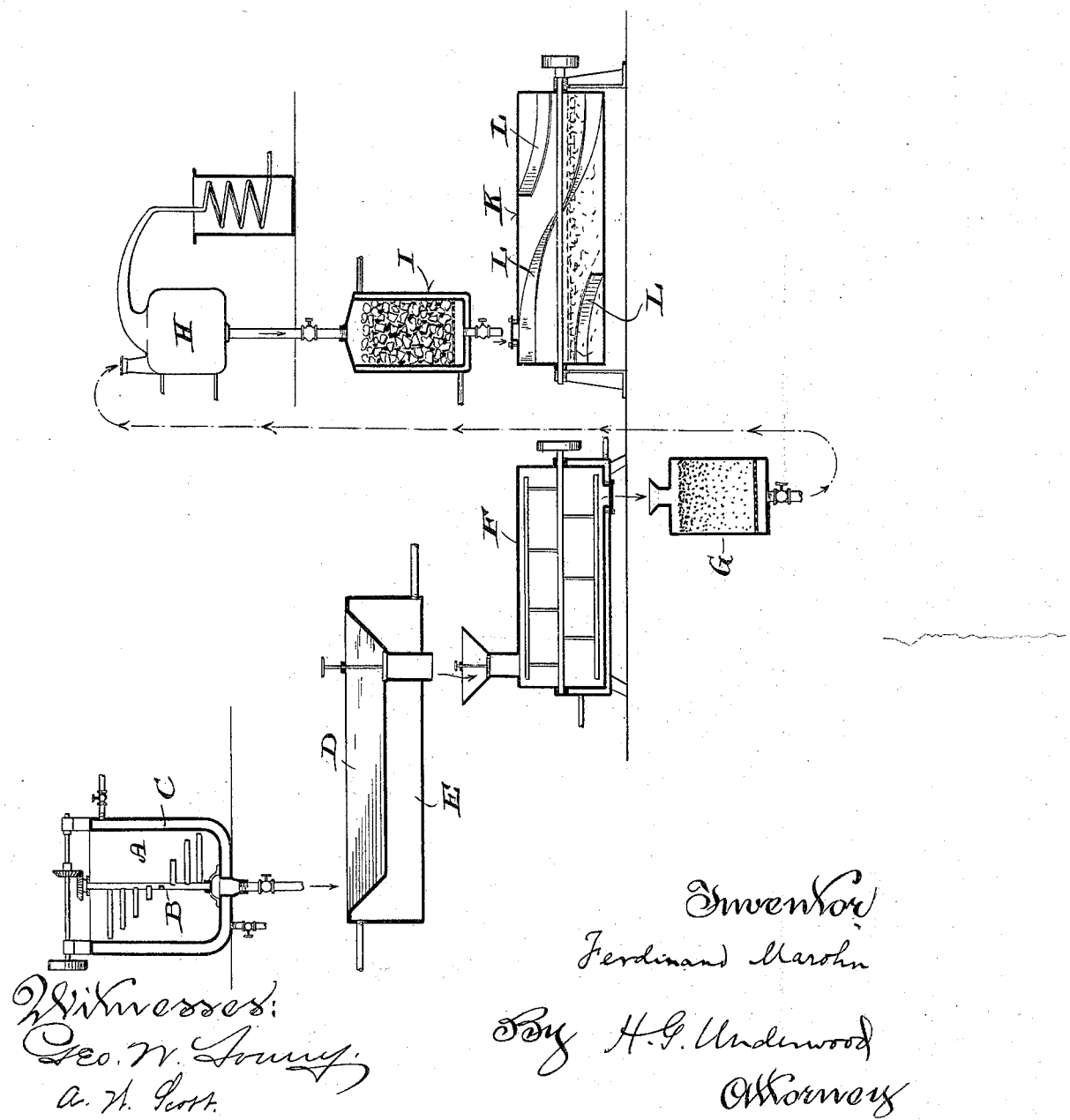

UNITED STATES PATENT OFFICE.

FERDINAND MAROHN, OF MILWAUKEE, WISCONSIN.

PROCESS OF PRODUCING OINTMENT BASES FROM RAW WOOL-FAT.

SPECIFICATION forming part of Letters Patent No. 556,014, dated March 10, 1896.

Application filed January 5, 1894. Serial No. 495,844. (No specimens.)

*To all whom it may concern:*

Be it known that I, FERDINAND MAROHN, a citizen of the United States, and a resident of Milwaukee, in the county of Milwaukee, and in the State of Wisconsin, have invented certain new and useful Improvements in the Production of an Ointment Base from Raw Wool-Fat; and I do hereby declare that the following is a full, clear, and exact description thereof.

My invention relates to the production of an ointment base from raw wool-fat; and it consists in a certain method or process therefor, as will be hereinafter described and subsequently claimed.

The accompanying drawing is a representation of apparatus by means of which my described process may be carried out, though I do not limit myself in any sense to the particular devices therein illustrated, as the same may be varied in a great variety of ways.

In carrying out my invention I take, say, one hundred pounds of raw commercial wool-fat and put it in a suitable tank and heat it to about 120° Fahrenheit, which melts it, and then I add, say, fifty pounds of alcohol and stir or agitate the mass together and draw off the alcohol, which latter contains the free acids and impurities from the wool-fat. It may be necessary to repeat this once or twice, until the wool-fat is thoroughly purified. The purified wool-fat is then put into a suitable pan and thoroughly mixed with an equal quantity of granulated bone-charcoal into a uniform mass and kept under a heat of from 120° to 150° Fahrenheit for about twenty-four hours. The mass is then withdrawn and put into a steam-jacketed stirring-drum, and a quantity of benzine equal to, say, one-half the mass, in weight, is added, and the stirring apparatus set in motion and the contents of the drum thoroughly agitated and mixed, steam being applied within the drum-jacket to keep the contents in a melted condition until the benzine has absorbed all the grease in the mixture (which may take from one to two hours) and then this solution is drawn off and filtered, which frees it from the charcoal. This filtered solution is put into a steam-jacket still to drive off the benzine and the residuum (which consists of pure wool-fat, but retaining some odor of the benzine) is then put through a bone-charcoal filter heated by a steam-jacket, which effectually rids the wool-fat of any taint of the benzine. The filtered wool-fat is now put into a mixer and stirred slowly for from two to three hours in the presence of air, this mixing with air reducing the entire mass to a uniform consistency of a light-yellow color, suitable for an ointment-base, and remarkably free from all impurities.

With apparatus constructed and arranged substantially as shown in the accompanying drawing, A may represent the mixing-tank hereinbefore first referred to, provided with a stirring apparatus B and a steam-jacket C.

D represents the suitable pan named with a lower steam-heating jacket E.

F represents the steam-jacketed stirring-drum; G, the filter for freeing the contents of the said drum from the charcoal; H, the steam-jacketed still to drive off the benzine, and I the steam-jacketed bone-charcoal filter, while K represents one form of the air-mixing device.

While the foregoing described and illustrated apparatus may be conveniently used to carry out my process, the several devices shown may be varied in construction in many ways, as stated. For example, take the air-mixing device. In the drawing I show a horizontal revolving drum K with spiral fan-blades L L L secured to the inner periphery thereof, and this drum is but half filled with the filtered wool-fat from the filter I, and when the drum is revolved slowly the air in said drum is thoroughly mixed with the wool-fat, as stated; but in place of this drum any other form of tank or drum with suitable fan-blades may be employed, and a device like that shown at A will answer, with the stirring device B operated in the reverse manner from that in which it is operated for the original mixing of the wool-fat and alcohol, and any of the devices may be likewise changed and other devices substituted therefor within the limits of my claims without departing from the spirit of my invention.

Having thus described my invention, what I claim as new, and desire to secure by Letters Patent, is—

1. The herein-described process of manufacturing an ointment base from raw wool-fat, consisting in first purifying the raw wool-fat with alcohol, mixing the purified fat with granulated bone-charcoal, under heat, then adding benzine, and stirring the whole mass under heat until the benzine has absorbed all the grease therefrom, drawing off and filtering the resulting solution, driving off the benzine in a still, filtering the residuum through a heated bone-charcoal filter and stirring the filtered mass slowly in the presence of air until it is reduced to a homogeneous light-colored mass free from odors and impurities.

2. The herein-described process of manufacturing an ointment base from raw wool-fat, consisting in the following steps in the order named; first, taking a given quantity of raw commercial wool-fat and heating the same in a suitable tank to about 120° Fahrenheit; second, adding thereto about half the quantity, by weight, of alcohol, and agitating the mass, and draining off the alcohol with its contained impurities; third, mixing the purified wool-fat with an equal quantity, by weight, of granulated bone-charcoal, until the whole is reduced into a homogeneous mass, and subjecting the same to a heat of from 120° to 150° Fahrenheit, for about twenty-four hours; fourth, adding to the mass one-half the quantity, by weight, of benzine, and putting the whole within a closed stirring-drum, and subjecting the mass to agitation, in the presence of steam, so as to keep it in a melted condition, for from one to two hours; fifth, drawing off and filtering this solution; sixth, putting this filtered solution in a still and driving off the benzine; seventh, heating and filtering the residuum, and eighth, stirring the filtered mass slowly in the presence of air until it is reduced to a homogeneous light-colored mass free from odors and impurities, substantially as set forth.

In testimony that I claim the foregoing I have hereunto set my hand, at Milwaukee, in the county of Milwaukee and State of Wisconsin, in the presence of two witnesses.

FERDINAND MAROHN.

Witnesses:
H. G. UNDERWOOD,
C. W. SCOTT.